United States Patent
Zhang et al.

(10) Patent No.: US 9,942,865 B2
(45) Date of Patent: Apr. 10, 2018

(54) METHOD AND DEVICE FOR SYNCHRONOUSLY COUNTING MBMS SERVICE

(75) Inventors: Dajun Zhang, Beijing (CN); Li Chen, Beijing (CN)

(73) Assignee: DATANG MOBILE COMMUNICATIONS EQUIPMENT CO., LTD, Beijing (CN)

( * ) Notice: Subject to any disclaimer, the term of this patent is extended or adjusted under 35 U.S.C. 154(b) by 340 days.

(21) Appl. No.: 13/978,400

(22) PCT Filed: Dec. 26, 2011

(86) PCT No.: PCT/CN2011/084625
§ 371 (c)(1),
(2), (4) Date: Jul. 8, 2013

(87) PCT Pub. No.: WO2012/092819
PCT Pub. Date: Jul. 12, 2012

(65) Prior Publication Data
US 2013/0286926 A1    Oct. 31, 2013

(30) Foreign Application Priority Data
Jan. 4, 2011 (CN) .......................... 2011 1 0000419

(51) Int. Cl.
*H04W 56/00* (2009.01)
*H04W 72/00* (2009.01)
*H04W 4/06* (2009.01)

(52) U.S. Cl.
CPC ..... *H04W 56/0015* (2013.01); *H04W 72/005* (2013.01); *H04W 4/06* (2013.01)

(58) Field of Classification Search
CPC ..... H04W 4/06; H04W 56/00; H04W 72/005; H04W 24/00; H04W 76/00; H04W 24/02;
(Continued)

(56) References Cited

U.S. PATENT DOCUMENTS

2007/0117579 A1* 5/2007 Cai et al. ................. 455/509
2008/0274759 A1  11/2008 Chen et al.
(Continued)

FOREIGN PATENT DOCUMENTS

| CN | 101064864 A | 10/2007 |
| CN | 102045646 A | 5/2011 |
| WO | 2009/100577 A1 | 8/2009 |

OTHER PUBLICATIONS

Huawei, "MBMS reception status counting", Oct. 11-15, 2010, 3GPP, 3GPP TSG-RAN WG3 Meeting #69bis, R3-102644.*
(Continued)

*Primary Examiner* — Paul H Masur
*Assistant Examiner* — Michael Phillips
(74) *Attorney, Agent, or Firm* — Oliff PLC

(57) ABSTRACT

Disclosed are a method and a device for synchronously counting a multimedia broadcast multicast service (MBMS) service. Through technical solutions of embodiments of the present invention, synchronization time point information is carried in a message sent to a base station by an MBMS coordinating entity (MCE), so that the base station counts the MBMS service at the corresponding synchronization time point, collects the counting information and feeds back the counting information to the MCE. Whereby, the base station can count the MBMS service for each terminal device served by the base station at the same time point and collect and transmit the MBMS service counting information to the MCE, thereby ensuring synchronization of MBMS service counting time, ensuring synchronization of multicast control channel (MCCH) contents at the air interface, and solving the problem that synchronization of MBMS service counting time cannot be ensured in the prior art.

13 Claims, 6 Drawing Sheets

(58) Field of Classification Search
CPC . H04W 24/08; H04W 24/10; H04W 72/1205;
H04W 76/002; H04W 72/121; H04W
56/0015; H04L 12/18; H04L 12/189;
H04L 12/1863; H04L 65/4076; H04L
67/22; H04L 69/28; H04L 12/185
See application file for complete search history.

(56) References Cited

U.S. PATENT DOCUMENTS

| | | | |
|---|---|---|---|
| 2010/0254352 A1* | 10/2010 | Wang et al. | 370/332 |
| 2010/0315988 A1* | 12/2010 | Chen | 370/312 |
| 2011/0305183 A1* | 12/2011 | Hsu et al. | 370/312 |
| 2012/0155364 A1* | 6/2012 | Kim et al. | 370/312 |
| 2013/0286926 A1 | 10/2013 | Zhang et al. | |

OTHER PUBLICATIONS

International Search Report of PCT/CN2011/084625, dated Mar. 29, 2012.
Written Opinion of the International Searching Authority of PCT/CN2011/084625, dated Mar. 29, 2012.
International Preliminary Report on Patentability of PCT/CN2011/084625, dated Jul. 10, 2013.

* cited by examiner

US 9,942,865 B2

METHOD AND DEVICE FOR SYNCHRONOUSLY COUNTING MBMS SERVICE

CROSS REFERENCE TO RELATED APPLICATIONS

This application is the National Stage of PCT CN 2011084625 filed on Dec. 26, 2011, which claims priority under 35 U.S.C. § 119 of Chinese Application No. CN 201110000419.3 filed on 4 Jan. 2011, the disclosures of which are incorporated by reference. The international application under PCT article 21(2) was not published in English.

FIELD OF THE PRESENT INVENTION

The present invention relates to communication field, in particular to a method and device for synchronously counting MBMS service.

BACKGROUND OF THE PRESENT INVENTION

MBMS (Multimedia Broadcast Multicast Service) is used to provide multimedia broadcast and multicast services for users in a wireless cell. In an LTE (Long Term Evolution) system, it can be provided on a frequency layer dedicated to MBMS or the one shared with MBMS.

An LTE cell supporting MBMS can be an MBMS dedicated cell or an MBMS/unicast mixed cell. MBMS service can perform single-cell transmission or multi-cell transmission. The multi-cell transmission of MBMS needs to support an MBSFN (Multicast/Broadcast over Single-Frequency Network) transmission mode.

MBSFN means synchronous transmission in a plurality of cells at the same frequency and time. The use of this transmission mode can save frequency resources and improve the availability of frequency spectrum. This technology requires a plurality of cells to send the identical contents at the same time. In this way, a UE (User Equipment) receiver takes a plurality of MBSFN cells as a big cell. Therefore, a terminal will not suffer the inter-cell interference transmitted by an adjacent cell and will benefit from the superposition of signals from a plurality of MBSFN cells. Both an MBMS dedicated cell and an MBMS/unicast mixed cell can adopt the MBSFN transmission mode. Besides, the use of advanced terminal receivers can solve the problem of time difference of multipath propagation, thus eliminating the intra-cell interference. Diversity effects brought by this multi-cell co-frequency transmission can also solve the problem of dead zone coverage, enhance the reliability of reception and improve the coverage rate.

MBMS multi-cell transmission technology has the following technical features:

(1) Synchronously transmit MBMS in an MBSFN area.

(2) Support the merging of multi-cell MBMS transmission.

(3) Map an MTCH (Multicast Traffic Channel) and an MCCH (Multicast Control Channel) to an MCH (Multicast Channel) for PTM (Point To Multipoint) transmission.

(4) Configure an MBSFN synchronization area in a semi-static state, for example, through O&M (Operation and Maintenance).

Logic channels relating to MBMS transmission mainly include BCCH (Broadcast Control Channel), MCCH and MTCH. The major functions of each channel are as follows:

(1) A BCCH is used for a network to broadcast the system information to a terminal.

For MBMS, a BCCH carries the configuration information of an MCCH, such as repetition period of the MCCH, initial radio frame offset, subframe position, MCCH modification period, indication mode of MCCH modification notices, MCS (Modulation Coding Scheme) format for MCCH transmission, etc., so that a terminal can find the resource position of the MCCH and the BCCH does not carry the specific information about MBMS service.

(2) An MCCH is a PTM downlink channel and is used for a network to transmit the MBMS-related control information in the MBSFN area to a terminal.

An MCCH correspond to one or a plurality of MTCHs, that is to say, it can carry the control information about plurality of MTCHs. The information contained in an MCCH includes subframe distribution and subframe distribution repetition period of the MBSFN area, and configuration information of a PMCH (Physical Multicast Channel) or an MCH, for example: MBMS session information, data MCS format configuration, PMCH subframe position, scheduling period, etc.

(3) An MTCH is a PTM downlink channel and is used for a network to send the specific MBMS service data to a terminal.

The network indicates configuration information about an MCCH using a BCCH to the terminal and provides (P) MCH information using an MCCH for the terminal, so that the terminal reads the MSI about specific services on (P) MCH, thus receiving MBMS service on an MTCH.

A schematic diagram of the relation between an MBMS service area and an MBSFN synchronization area in the prior art is shown in FIG. 1.

The MBMS service area is comprised of one or a plurality of identifications, each of which is mapped to one or a plurality of cells. It is carried by a in a BM-SC (Broadcast Multicast Service Center) session message to a base station.

An MBSFN area is comprised of a group of cells in a synchronization area. These cells send the MBSFN synchronously. The MBSFN area is planned by an MCE (MBMS Coordinating entity) according to the operator's strategy and informed in an M2 interface message to a base station.

An MBSFN area reserved cell is also a synchronization area where an MBSFN is not sent.

Now, the available LTE MBMS logical architecture is shown in FIG. 2, wherein, an MCE is the centralized node at RAN side, while the interface M2 is the logic interface between an MCE and an eNB (evolved Node B) and can be used for transmitting the area identifications of an MBSFN. The scheduling information of an MCE to MBMS service is used for updating MCCH configuration, forwarding session start, closure and update messages from an MME, and managing and configuring the interface M2.

In the prior art, before MBMS transmission, an MCE needs to count the number of UE which is interested in MBMS service in an area and to allocate the resources subsequently according to statistical results. As shown in FIG. 3, an MCE is responsible for the allocation of MBSFN resources and corresponding configuration. So the receiving state of UE to a certain MBMS service should be fed back to the MCE which will adjust an MBSFN area in a dynamic or semi-static state according to the information, thus ensuring the effective use of resources.

Therein, details of an MCE sending a counting request to an eNB have not been determined, while the counting request sent by the eNB to UE is carried in an MCCH. Here the counting request is an MBMS receiving state reporting request and counting response means MBMS receiving state reporting.

In the procedure of realizing the objects of the present invention, at least the following problems existing in the current technologies were found:

In an LTE system, the counting request sent by an eNB to UE is carried in an MCCH. Therefore, different cells in an MBSFN area must be transmitted synchronously to ensure synchronous transmission characteristics of an MCCH. Although a mechanism of an MCE informing an eNB to count UE MBMS service receiving states is supported now, it fails to ensure the synchronous transmission of the information in an MCCH.

SUMMARY OF THE PRESENT INVENTION

The embodiments of the present invention provide a method and device for synchronously counting MBMS service to solve the problem that synchronization of MBMS service counting time cannot be ensured in the prior art.

To achieve the above purpose, the embodiments of the present invention provide a method for synchronously counting MBMS service, which comprises:

An MCE sending a message containing the synchronization time point information to each base station;

The MCE receiving the synchronization counting information sent by each base station, wherein, the synchronization counting information is the information obtained when each said base station counts MBMS service for each terminal device served by each said base station at the time corresponding to the synchronization time point information.

Besides, the embodiments of the present invention also provide an MCE, which comprises:

A sending module sending a message containing the synchronization time point information to each base station;

A receiving module receiving the synchronization counting information sent by each said base station, wherein, the synchronization counting information is the information obtained when each said base station counts MBMS service for each terminal device served by each said base station at the time corresponding to the synchronization time point information.

Besides, the embodiments of the present invention provide a method for synchronously counting MBMS service, which comprises:

A base station receiving a message containing the synchronization time point information sent by an MCE;

The base station counting MBMS service for each terminal device served by the base station at the time corresponding to the synchronization time point information;

The base station collecting MBMS service counting results of each terminal device served by the base station to obtain the synchronization counting information;

The base station sending the synchronization counting information to the MCE.

Besides, the embodiments of the present invention provide base station, which comprises:

A receiving module receiving a message containing the synchronization time point information sent by an MCE;

A statistics module counting MBMS service for each terminal device served by each base station at the time corresponding to the synchronization time point information and collecting MBMS service counting results of each terminal device served by each said base station to obtain the synchronization counting information;

A sending module sending the synchronization counting information obtained by the statistics module to the MCE.

Compared with the prior art, the embodiments of the present invention have the following characteristics:

Through technical solutions of embodiments of the present invention, synchronization time point information is carried in a message sent to a base station by an MCE, so that the base station counts the MBMS service at the corresponding synchronization time point, collects the counting information and feeds back the counting information to the MCE. Whereby, the base station can count the MBMS service for each terminal device served by the base station at the same time point and collect and transmit the MBMS service counting information to the MCE, thereby ensuring synchronization of MBMS service counting time, ensuring synchronization of multicast control channel (MCCH) contents at the air interface, and solving the problem that synchronization of MBMS service counting time cannot be ensured in the prior art.

BRIEF DESCRIPTION OF THE DRAWINGS

A schematic diagram of the relation between an MBMS service area and an MBSFN synchronization area in the prior art is shown in FIG. 1;

An LTE MBMS logic architecture in the prior art is shown in FIG. 2;

Figure 1:
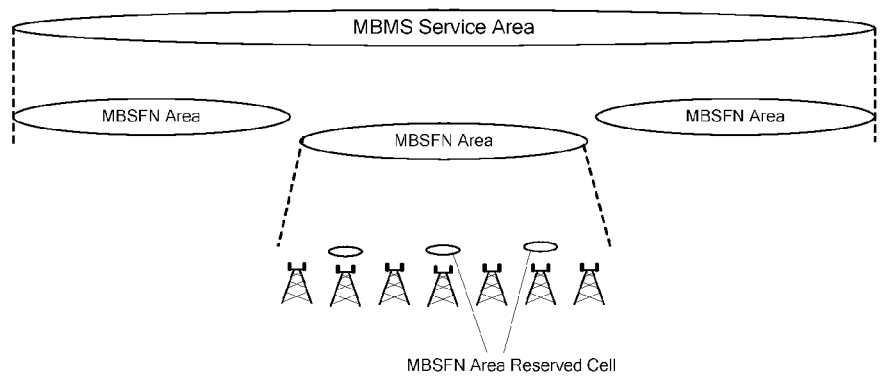
Figure 2:
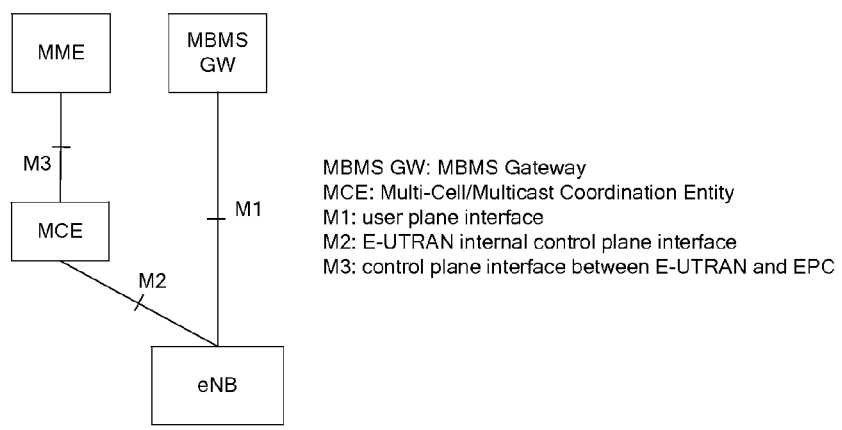
Figure 3:
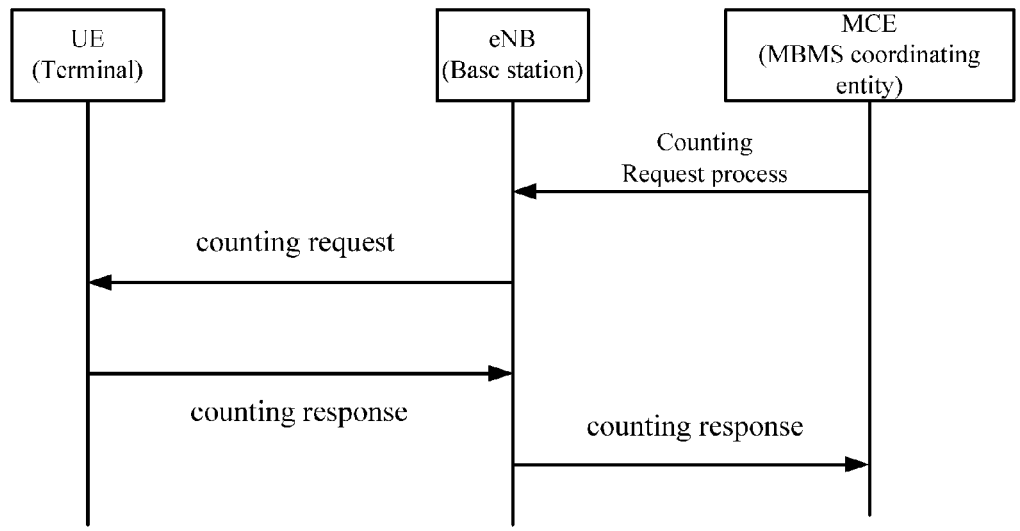
Figure 4:
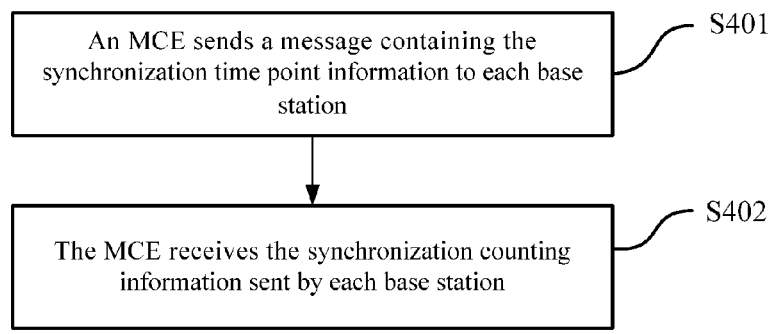
Figure 5:
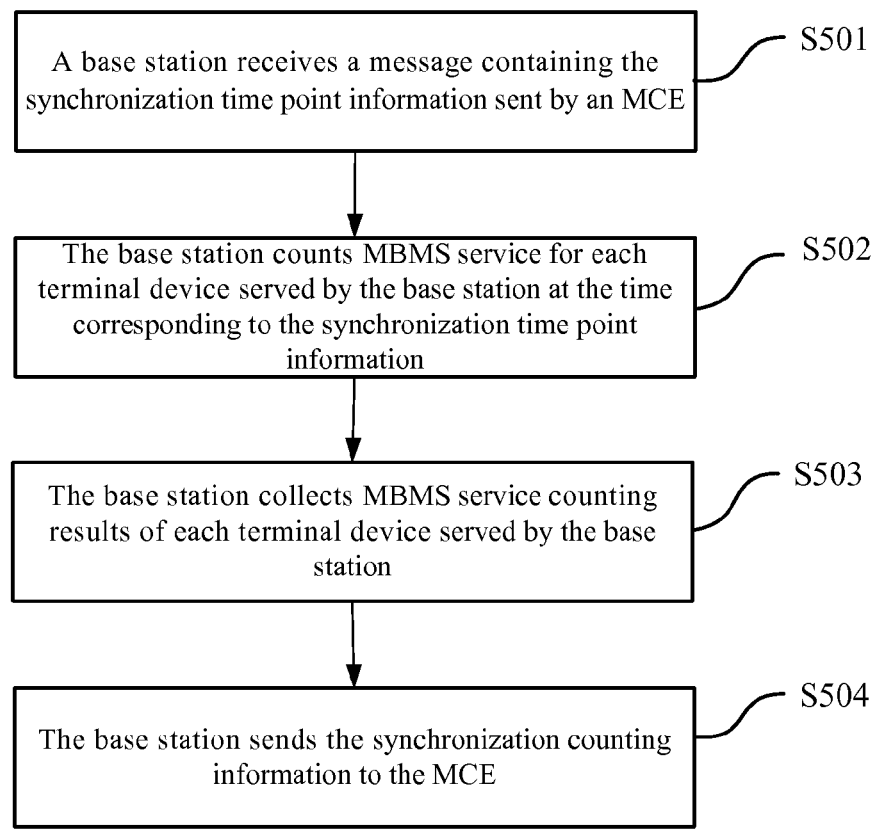
Figure 6:
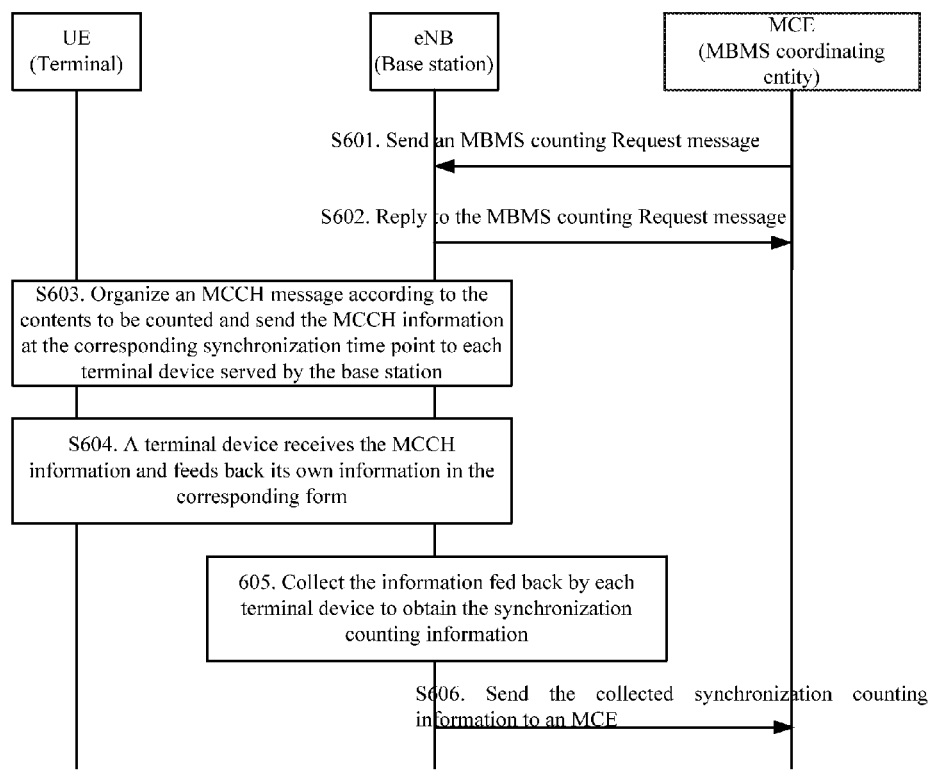
Figure 7:
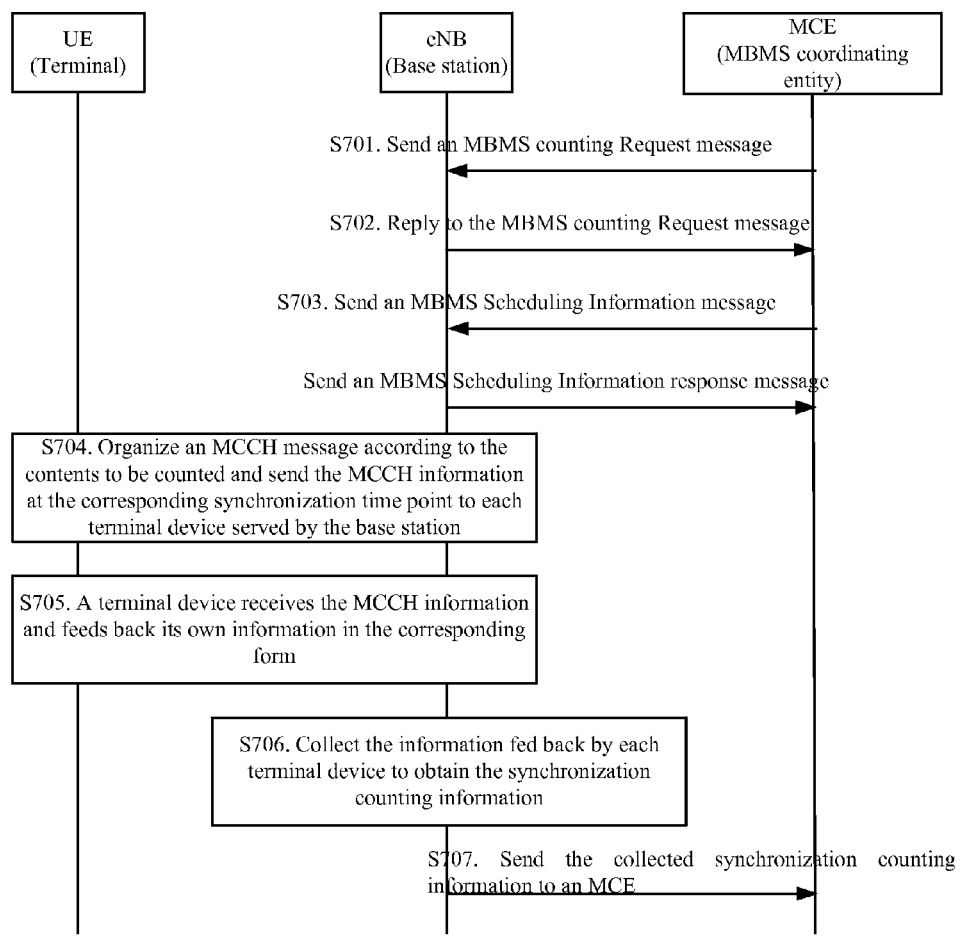
Figure 8:
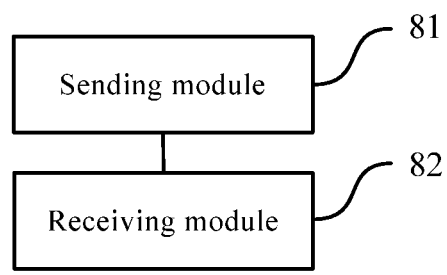
Figure 9:
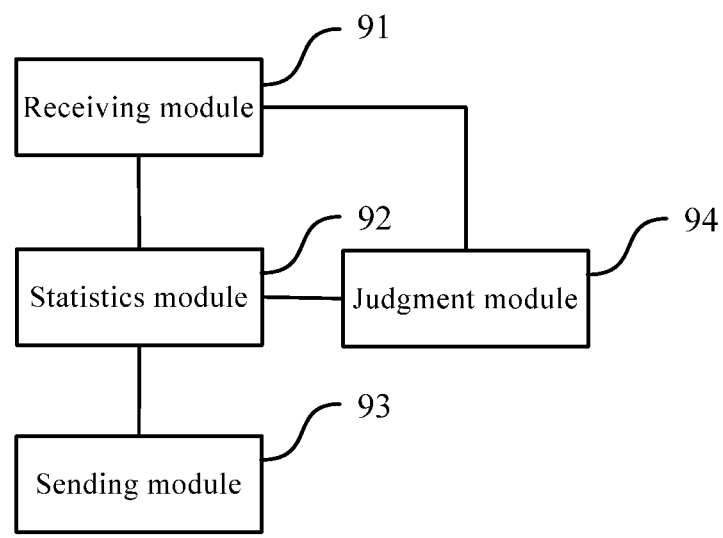

A flow diagram of a method for counting the MBMS service in the prior art is shown in FIG. 3;

A flow diagram of a method for synchronously counting MBMS service at MCE side proposed in the embodiments of the present invention is shown in FIG. 4;

A flow diagram of a method for synchronously counting MBMS service at base station side proposed in the embodiments of the present invention is shown in FIG. 5;

A flow diagram of a method for synchronously counting MBMS service in a specific application site proposed in the embodiments of the present invention is shown in FIG. 6;

A flow diagram of a method for synchronously counting MBMS service in a specific application site proposed in the embodiments of the present invention is shown in FIG. 7;

A structural diagram of an MCE proposed in the embodiments of the present invention is shown in FIG. 8;

A structural diagram of a base station proposed in the embodiments of the present invention is shown in FIG. 9.

DETAILED DESCRIPTION OF THE EMBODIMENTS OF THE PRESENT INVENTION

As described in the background of the present invention, the operation of a base station launching the corresponding MBMS service counting on each terminal device cannot be ensured in the prior art, so time synchronization of the MBMS service technology cannot be ensured, either.

To solve the above problem, the embodiments of the present invention give a method for synchronously counting MBMS service, namely informing a base station of the corresponding synchronization time point through an MCE, so that each base station counts the MBMS service for each terminal device served by the base station at the corresponding synchronization time point, collects the counting information and feeds back the counting information to the MCE, thus ensuring synchronization of MBMS service counting time of each terminal device.

A flow diagram of a method for synchronously counting MBMS service at MCE side provided in the embodiments of the present invention is shown in FIG. 4. The method includes the following specific steps:

S401, an MCE sends a message containing the synchronization time point information to each base station;

S402, the MCE receives the synchronization counting information sent by each base station.

Therein, the synchronization counting information is the information obtained when each base station counts MBMS service for each terminal device served by the base station at the time corresponding to the synchronization time point information.

In the actual application site, an MCE can send a message containing the synchronization time point information to each base station with the following two methods, which comprise:

Method I, the MCE sends an MBMS counting request message containing the synchronization time point information to each base station.

Method II, the MCE sends a message containing the synchronization time point information and corresponding to an MBMS process to each base station.

In this method, it is also necessary to cooperate with the MBMS counting request message sent by the MCE to each base station for the purpose of counting the corresponding MBMS service finally. Thus the MCE should send the MBMS counting request message to a base station before sending the message containing the synchronization time point information and corresponding to an MBMS process to each base station.

A base station feeds back the corresponding MBMS service counting only after receiving all MBMS counting request messages and the corresponding the synchronization time point information.

In the specific application site, the use of the above methods is adjusted based on actual needs and changes in specific methods will not affect the protection scope of the present invention.

The above process is the implementation process of a method for synchronously counting MBMS service at MCE side proposed in the embodiments of the present invention. Following is the implementation process of a method for synchronously counting MBMS service at base station side proposed in the embodiments of the present invention. The flow diagram of the method is shown in FIG. 5 with the specific steps as follows:

S501, a base station receives a message containing the synchronization time point information sent by an MCE.

S502, the base station counts the MBMS service for each terminal device served by the base station at the time corresponding to the synchronization time point information.

S503, the base station collects MBMS service counting results of each terminal device served by the base station to obtain the synchronization counting information.

S504, the base station sends the synchronization counting information to the MCE.

Similar to the forgoing description, a base station receives a message containing the synchronization time point information sent by an MCE with two methods as shown below:

Method I, the base station receives an MBMS counting request message containing the synchronization time point information sent by the MCE.

If using this method, it is equivalent to the base station receiving the MBMS counting request message and the corresponding synchronization time point information at the same time, thus the corresponding MBMS service technical operations will be triggered and subsequent processing implemented directly as per the above S502 to S505.

Method II, the base station receives a message containing the synchronization time point information and corresponding to an MBMS process sent by the MCE.

If using this method, the base station receives the synchronization time point information through the message corresponding to an MBMS process and needs to separately receive an MBMS counting request message. The MBMS service counting information can be totally fed back only when both the synchronization time point information and the message are received. Next the MBMS counting request message of the base station and the method of processing the message containing the synchronization time point information and corresponding to an MBMS process will be explained separately.

(1) The base station receives a counting request message sent by an MCE.

When the base station receives the counting request message sent by the MCE, it will judge whether the message containing the synchronization time point information and corresponding to an MBMS process was received before.

If received, the base station has received an MBMS counting request message and the corresponding synchronization time point information, thus the corresponding MBMS service technical operations will be triggered and subsequent processing implemented directly as per the above S502 to S505.

On the contrary, if not received, the base station will receive the counting request message and will not count and feed back the MBMS service temporarily.

(2) The base station receives a message containing the synchronization time point information and corresponding to an MBMS process sent by an MCE.

When the base station receives the message containing the synchronization time point information and corresponding to an MBMS process sent by the MCE, it will judge a counting request message was received before;

If received, the base station has received the MBMS counting request message and the corresponding synchronization time point information, thus the corresponding MBMS service technical operations will be triggered and subsequent processing implemented directly as per the above S502 to S505.

Therein, the judgment of being received is equivalent to a base station storing a counting request message mentioned above. That is to say, after the base station receiving the message, it has to save the message temporarily as it does not receive a message containing the synchronization time point information and corresponding to an MBMS process for the time being, thus the corresponding MBMS service counting operation and feedback will not be triggered.

If not received, the base station does not receive the MBMS counting request message, thus MBMS service counting feedback will not be triggered temporarily, but MBMS service will be counted for each terminal served by the base station at the time corresponding to the synchronization time point information and the counting request message saved after being obtained by collection. That is to say, the MBMS service will only be counted and MBMS service counting feedback triggered after receiving the counting request message.

It should be further pointed that, the message corresponding to an MBMS process includes an MBMS session start message and/or an MBMS scheduling message, and changes in specific message types will not affect the protection scope of the present invention.

In the specific application site, the specific form of the abovementioned synchronization time point information can be the absolute number of MCCH modification periods.

Compared with the prior art, the embodiments of the present invention have the following advantages:

Through technical solutions of embodiments of the present invention, synchronization time point information is carried in a message sent to a base station by an MCE, so that the base station counts the MBMS service at the corresponding synchronization time point, collects the counting information and feeds back the counting information to the MCE. Whereby, the base station can count the MBMS service for each terminal device served by the base station at the same time point and collect and transmit the MBMS service counting information to the MCE, thereby ensuring synchronization of MBMS service counting time, ensuring synchronization of multicast control channel (MCCH) contents at the air interface, and solving the problem that synchronization of MBMS service counting time cannot be ensured in the prior art.

Next technical solutions proposed in the embodiments of the present invention will be explained in combination with the specific application site.

The core concept of technical solutions proposed in the embodiments of the present invention is to introduce the time limit information to a message sent to a base station by an MCE, wherein, the time limit information specifies the time of the base station launching the MBMS service counting to a terminal device in an MCCH.

Such a time limit can ensure that different base stations in an MBSFN area can launch the MBMS service counting to a terminal device served by the base stations at the same time.

In the actual application site, the above method of introducing the time limit information is to introduce synchronization identifications during MBMS counting sent to the base stations by the MCE.

Specific methods include the following two:

Method I, an MCE carries the synchronization time point information in an MBMS counting Request message (namely the foregoing MBMS counting request message).

A flow diagram of a method for synchronously counting MBMS service in a specific application site proposed in the embodiments of the present invention is shown in FIG. 6. The method includes the following specific steps:

S601, an MCE sends an MBMS counting Request message carrying the synchronization time point information to each eNB.

S602, each said eNB replies to the MCE the MBMS counting Request message after receiving it in response to this request.

S603, each said eNB organizes an MCCH message according to the contents to be counted and sends the MCCH message to each terminal device served by each said eNB at the corresponding synchronization time point.

S604, each said terminal device feeds back its own information in the corresponding form after receiving the MCCH message.

S605, each said eNB collects the information fed back by each said terminal device to obtain the synchronization counting information.

S606, each said eNB sends the collected synchronization counting information using an independent count reporting process to the MCE.

Therein, the corresponding cell formats carrying the synchronization time point information are shown in Table 1:

TABLE 1

Cell Formats Carrying the Synchronization Time Point Information

| IE/Group Name | Value Range | Description |
|---|---|---|
| Message Type | | 9.2.1.1 |
| A List of MBSFN Area Counting | | |
| >MBSFN Area Counting | 1 to <maxnoofMBSFNareas> | |
| >>MBSFN Area ID | | Uniquely identify an MBSFN area |
| >>MBMS Counting Request Service | | |
| >>>MBMS Counting Request Session Item | 1 to <maxnoofcountingservice> | |
| >>>>TMGI | | Uniquely identify an MBSFN service |
| MCCH Update Time | | Show the synchronization time point |

Therein, MCCH Update Time shows the synchronization time point during MBMS service counting which can be expressed as the absolute number of MCCH modification periods in the actual application site.

Method II, an MCE carries the synchronization time point information in messages corresponding to other MBMS processes.

In the actual application site, the aforementioned messages corresponding to other MBMS processes include: MBMS session start messages or MBMS scheduling messages.

For the sake of convenient description, the embodiments of the present invention describe corresponding processing procedures taking an MBMS scheduling message carrying the synchronization time information as an example. As shown in FIG. 7, the procedures include the following specific steps:

S701, an MCE sends an MBMS counting Request message to each eNB.

S702, each said eNB replies to the MCE the MBMS counting Request message after receiving it in response to this request.

The difference from the abovementioned S601 and S602 is that after receiving the MBMS counting Request message, each said eNB cannot independently organize the MCCH transmission as it does not receive the synchronization time point information.

S703, the MCE sends an MBMS Scheduling Information message to each said eNB and carries the synchronization time point information in the message.

S704, each said eNB organizes an MCCH message in combination with counting contents indicated by the MBMS counting Request message and contents scheduled by the MBMS Scheduling Information message, and sends the MCCH information at the corresponding synchronization time point.

After receiving an MBMS Scheduling Information message containing the synchronization time point information, each said eNB judges whether such a message was received before. If received, it will continue to implement the MBMS service counting operation and corresponding feedback processes in the following S705 to S707. If not received, it will indicate to implement the MBMS service counting operation in S705 and S706 and to save locally the synchronization counting information without feeding back it to the MCE. Corresponding feedback processes will be triggered only when the saved synchronization counting information meets the requirements of the MBMS counting request message after receiving the corresponding MBMS counting request message.

S705, each terminal device feeds back its own information in the corresponding form after receiving the MCCH information.

S706, each said eNB collects the information collected by each said terminal device to obtain the synchronization counting information.

S707, each said eNB sends the synchronization counting information using an independent count reporting process to the MCE.

Compared with the prior art, the embodiments of the present invention have the following advantages:

Through technical solutions of embodiments of the present invention, synchronization time point information is carried in a message sent to a base station by an MCE, so that the base station counts the MBMS service at the corresponding synchronization time point, collects the counting information and feeds back the counting information to the MCE. Whereby, the base station can count the MBMS service for each terminal device served by the base station at the same time point and collect and transmit the MBMS service counting information to the MCE, thereby ensuring synchronization of MBMS service counting time, ensuring synchronization of multicast control channel (MCCH) contents at the air interface, and solving the problem that synchronization of MBMS service counting time cannot be ensured in the prior art.

To realize technical solutions of the embodiments of the present invention, the embodiments of the present invention also provide an MCE with the structural diagram shown in FIG. 8, which comprises:

A sending module 81 sending a message containing the synchronization time point information to each base station;

A receiving module 82 receiving the synchronization counting information sent by each base station, wherein, the synchronization counting information is the information obtained when the base station counts MBMS service for each terminal device served by the base station at the time corresponding to the synchronization time point information.

In the specific application site, corresponding to the abovementioned two methods of sending, the sending module 81 is specifically used for:

Sending an MBMS counting request message containing the synchronization time point information; or Sending a message containing the synchronization time point information and corresponding to an MBMS process.

Furthermore, when the message containing the synchronization time point information sent by the sending module 81 is the one corresponding to an MBMS process, the sending module 81 is also used for:

Sending an MBMS counting request message to each base station;

Therein, the message corresponding to an MBMS process includes MBMS session start message and/or MBMS scheduling message.

Besides, the embodiments of the present invention also provide a base station with the structural diagram shown in FIG. 9, which comprises:

A receiving module 91 receiving a message containing the synchronization time point information sent by an MCE;

A statistics module 92 counting the MBMS service for each terminal device served by a base station at the time corresponding to the synchronization time point information and collecting MBMS service counting results of each terminal device served by the base station to obtain the synchronization counting information.

A sending module 93 sending the synchronization counting information obtained by the statistics module 92 to the MCE.

In the specific application site, corresponding to the abovementioned two methods of sending, the receiving module 91 is specifically used for:

Receiving an MBMS counting request message containing the synchronization time point information sent by an MCE; or Receiving a message containing the synchronization time point information and corresponding to an MBMS process sent by an MCE.

Furthermore, when the message containing the synchronization time point information received by the receiving module 91 is the one corresponding to an MBMS process, the receiving module 91 is also used for receiving a counting request message sent by an MCE.

It should be further pointed that the aforementioned base station also includes:

A judgment module 94 judging whether a message containing the synchronization time point information and corresponding to an MBMS process is received by the receiving module 91 after the receiving module 91 receives a counting request message sent by an MCE;

If received, the base station notifies each terminal device served by the judgment module 94 at the time corresponding to the synchronization time point information to count the MBMS service.

If not receive, the base station saves the counting request message.

Correspondingly, the judgment module 94 is also used for:

Judging whether a counting request message sent by an MCE is received when the receiving module 91 receives a message containing the synchronization time point information and corresponding to an MBMS process;

If received, the base station notifies each terminal device served by the judgment module 92 at the time corresponding to the synchronization time point information to count the MBMS service and enables the sending module 93 to send the synchronization counting information to an MCE after obtaining the information by collection;

If not received, the base station notifies each terminal device served by the judgment module 92 at the time corresponding to the synchronization time point information to count the MBMS service and saves the synchronization counting information after obtaining the information by collection.

Compared with the prior art, the embodiments of the present invention have the following advantages:

Through technical solutions of embodiments of the present invention, synchronization time point information is carried in a message sent to a base station by an MCE, so that the base station counts the MBMS service at the corresponding synchronization time point, collects the counting information and feeds back the counting information to the MCE. Whereby, the base station can count the MBMS service for each terminal device served by the base station at the same time point and collect and transmit the MBMS service counting information to the MCE, thereby ensuring synchronization of MBMS service counting time, ensuring synchronization of multicast control channel (MCCH) contents at the air interface, and solving the problem that synchronization of MBMS service counting time cannot be ensured in the prior art.

Through the description of the embodiments above, the technical personnel in this field can understand clearly that the present invention can be implemented by hardware or software and necessary current hardware platform. Based on this understanding, the technical scheme of the present invention can be embodied by a form of software products which can be stored in a nonvolatile storage medium (such as CD-ROM, U disk, mobile hard disk, etc.), including a number of instructions for making a computer device (such as personal computers, servers, or network equipment, etc.) implement the methods described in the embodiments of the present invention.

The technical personnel in this field can be understood that the illustration is only schematic drawings of a preferred embodiment, and the module or process is not necessary for the implementation of the present invention.

The technical personnel in this field can be understood that the modules can be distributed in device of the embodiments according to the description of the embodiments above, and also can be varied in one or multiply device of the embodiments. The modules of the embodiments can be combined into a module, and also can be further split into several sub-modules.

The number of the embodiments is only to describe, it does not represent the pros and cons of the embodiments.

The descriptions above are just preferred implement ways of the present invention. It should be pointed that, for general technical personnel in this field, some improvement and decorating can be done, which should be as the service limit scope of the present invention.

The invention claimed is:

1. A method for synchronously counting Multimedia Broadcast Multicast Service (MBMS) service, comprising:
   sending, by a processor of an MBMS Coordinating Entity (MCE), a broadcast message containing a same synchronization time point to each of a plurality of base stations, whereby each base station can count the MBMS service for each terminal device served by the base station at the same synchronization time point and each relevant base station collects and transmits synchronization counting information to the MCE, thereby ensuring synchronization of MBMS service counting times, wherein the relevant base stations are base stations within an MBSFN area;
   receiving, by the processor of the MCE, the synchronization counting information from each of the plurality of relevant base stations, wherein
      the synchronization counting information is information obtained when each of the relevant base stations counts MBMS service for each terminal device served by the respective relevant base station at the time corresponding to the same synchronization time point, and
      the same synchronization time point is expressed as the absolute number of Multicast Control Channel (MCCH) modification periods.

2. The method according to claim 1, wherein the sending, by the processor of the MCE, the broadcast message containing the same synchronization time point to each of the plurality of base stations comprises one of:
   sending, by the processor of the MCE, an MBMS counting request message containing the same synchronization time point to each of the plurality of base stations; or sending, by the processor of the MCE, a broadcast message corresponding to an MBMS process to each of the plurality of base stations, the broadcast message corresponding to the MBMS process containing the same synchronization time point.

3. The method according to claim 2, wherein
The broadcast message containing the same synchronization time point sent to each base station by the MCE is the broadcast message corresponding to the MBMS process, and
the method further comprises, before the processor of the MCE sends the broadcast message containing the same synchronization time point to each of the plurality of base stations, sending, by the processor of the MCE, an MBMS counting request message to each of the plurality of base stations.

4. The method according to claim 2, wherein
the broadcast message containing the same synchronization time point sent to each base station by the processor of the MCE is the broadcast message corresponding to the MBMS process, and
the broadcast message corresponding to the MBMS process includes at least one of: an MBMS session start message, and an MBMS scheduling message.

5. A Multimedia Broadcast Multicast Service (MBMS) Coordinating Entity (MCE), comprising:
   a processor programmed to:
      send a broadcast message containing a same synchronization time point to each of a plurality of base stations, whereby each base station can count the MBMS service for each terminal device served by the base station at the same synchronization time point and each relevant base station collects and transmits synchronization counting information to the MCE, thereby ensuring synchronization of MBMS service counting times, wherein the relevant base stations are base stations within an MBSFN area; and
      receive the synchronization counting information from each of the relevant base stations, wherein
         the synchronization counting information is information obtained when each of the relevant base stations counts MBMS service for each terminal device served by the relevant base station at the time corresponding to the same synchronization time point, and
         the same synchronization time point is expressed as the absolute number of Multi Control Channel (MCCH) modification periods.

6. The MCE according to claim 5, wherein the processor is further programmed to at least one of:
   send MBMS counting request information containing the same synchronization time point to each of the plurality of base stations; or
   send a broadcast message corresponding to an MBMS process to each of the plurality of base stations, the broadcast message of the MBMS process containing the same synchronization time point.

7. The MCE according to claim 6, wherein
the same synchronization time point is sent by the processor to each of the plurality of base stations within the broadcast message corresponding to the MBMS process,
the processor is further programmed to send an MBMS counting request message to each of the plurality of base stations, and the broadcast message corresponding to the MBMS process includes an MBMS session start message and/or an MBMS scheduling message.

8. A method for synchronously counting Multimedia Broadcast Multicast Service (MBMS) service, comprising:
receiving, by a base station, a broadcast message containing a same synchronization time point from a processor of an MBMS Coordinating Entity (MCE), whereby each base station of a plurality of base stations that includes the base station can count the MBMS service for each terminal device served by the respective base station at the same synchronization time point, thereby ensuring synchronization of MBMS service counting times;
counting, by the base station, MBMS service for each terminal device served by the base station at the time corresponding to the same synchronization time point;
collecting, by the base station, MBMS service counting results of each terminal device served by the base station to obtain the synchronization counting information; and
sending, by the base station, the synchronization counting information to the processor of the MCE, wherein the same synchronization time point is expressed as the absolute number of Multicast Control Channel (MCCH) modification periods.

9. The method according to claim 8, wherein the receiving, by the base station, of the broadcast message containing the same synchronization time point from the MCE includes at least one of:
receiving, by the base station from the MCE, an MBMS counting request message containing the same synchronization time point, or
receiving, by the base station from the MCE, a broadcast message corresponding to an MBMS process, the broadcast message corresponding to the MBMS process containing the same synchronization time point.

10. The method according to claim 9, wherein
the method comprises: sending, by the base station, the broadcast message corresponding to the MBMS process, and
the broadcast message corresponding to the MBMS process is the MBMS counting request message containing the same synchronization time point sent by the MCE.

11. The method according to claim 10, further comprising, after the base station receives the broadcast MBMS counting request message sent by the MCE:
judging, by the base station, whether the same synchronization time point information has been received;
if the same synchronization time point has been received, counting, by the base station, the MBMS service for each terminal device served by the base station at the time corresponding to the same synchronization time point; and
if the same synchronization time point has not been received, saving, by the base station, the broadcast MBMS counting request message.

12. The method according to claim 9, wherein
the broadcast message containing the same synchronization time point sent by the MCE is the broadcast message corresponding to the MBMS process, and
the method further comprises:
judging, by the base station, whether the MBMS counting request message sent by the MCE has been received;
if the MBMS counting request message sent by the MCE has been received, counting, by the base station, the MBMS service for each terminal device served by the base station at the time corresponding to the same synchronization time point, and sending, by the base station, the synchronization counting information to the MCE after obtaining the synchronization counting information by collection; and
if the MBMS counting request message has not been received currently, counting, by the base station, the MBMS service for each terminal device served by the base station at the time corresponding to the same synchronization time point, and saving, by the base station, the synchronization counting information after obtaining the synchronization counting information by collection.

13. The method according to claim 9, wherein
the broadcast message containing the same synchronization time point sent to each of the plurality of base stations by the processor of the MCE is the broadcast message corresponding to the MBMS process, and
the broadcast message corresponding to the MBMS process includes at least one of: an MBMS session start message, and/or an MBMS scheduling message.

* * * * *